(12) United States Patent
Kim et al.

(10) Patent No.: US 9,319,231 B2
(45) Date of Patent: Apr. 19, 2016

(54) METHOD AND APPARATUS FOR TRANSMITTING A MAC CONTROL MESSAGE IN WIRELESS ACCESS SYSTEM

(75) Inventors: Jeongki Kim, Anyang-si (KR); Giwon Park, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 14/363,757

(22) PCT Filed: Jul. 13, 2012

(86) PCT No.: PCT/KR2012/005605
§ 371 (c)(1),
(2), (4) Date: Jul. 8, 2014

(87) PCT Pub. No.: WO2013/085128
PCT Pub. Date: Jun. 13, 2013

(65) Prior Publication Data
US 2014/0314043 A1    Oct. 23, 2014

Related U.S. Application Data

(60) Provisional application No. 61/568,157, filed on Dec. 8, 2011.

(30) Foreign Application Priority Data

Mar. 29, 2012   (KR) .......................... 10-2012-0032314

(51) Int. Cl.
*H04W 4/06*    (2009.01)
*H04L 12/18*   (2006.01)
(Continued)

(52) U.S. Cl.
CPC ............ *H04L 12/189* (2013.01); *H04B 7/2612* (2013.01); *H04W 4/005* (2013.01); *H04W 4/06* (2013.01); *H04W 72/005* (2013.01); *H04W 72/0406* (2013.01)

(58) Field of Classification Search
CPC ... H04B 7/2612; H04L 12/189; H04W 4/005; H04W 4/06; H04W 72/005; H04W 72/0406
USPC ......... 370/229–231, 236, 252, 270, 277–278, 370/282, 310.2, 312, 328–330, 338, 341, 370/390, 431–432; 455/420, 423.2, 434, 455/436–439, 444, 450–451, 452.1, 464
See application file for complete search history.

(56) References Cited

U.S. PATENT DOCUMENTS

| 8,130,710 | B2 * | 3/2012 | Lim ....................... H04L 1/0003 370/329 |
| 2010/0316007 | A1 * | 12/2010 | Son ....................... H04W 48/12 370/329 |
| 2012/0163276 | A1 * | 6/2012 | Kim ....................... H04W 4/06 370/312 |

FOREIGN PATENT DOCUMENTS

| WO | 2010/114303 | 10/2010 |
| WO | 2011/149200 | 12/2011 |

OTHER PUBLICATIONS

Kim, et al., "Clean-up of some texts in 802.16p AWD," IEEE 802.16 Broadband Wireless Access Working Group, IEEE 802.16p-11/0114r1, May 2011, 4 pages.

(Continued)

*Primary Examiner* — Mohamed Kamara
(74) *Attorney, Agent, or Firm* — Lee, Hong, Degerman, Kang & Waimey

(57) ABSTRACT

A method for transmitting a Medium Access Control (MAC) control message for an M2M device and an apparatus for supporting the same are disclosed herein. According to an exemplary embodiment, a method for transmitting a MAC control message includes the steps of receiving a broadcast assignment map information element (BA A-MAP IE) including a function index field and broadcast assignment information for the M2M device, and wherein the broadcast assignment information indicates a resource region to which the MAC control message is being transmitted, and, when a cyclic redundancy check (CRC) bit masked to the BA A-MAP IE indicates that the BA A-MAP IE is for a M2M broadcast assignment, receiving the MAC control message through the resource region, which is indicated by the broadcast assignment information.

20 Claims, 4 Drawing Sheets

(51) Int. Cl.
*H04W 4/00* (2009.01)
*H04W 72/04* (2009.01)
*H04B 7/26* (2006.01)
*H04W 72/00* (2009.01)

(56) References Cited

OTHER PUBLICATIONS

Nigam, "MGID Harmonization," IEEE 802.16 Broadband Wireless Access Working Group, IEEE C802.16p-11/0287r1, Nov. 2011, 10 pages.

Kim, et al., "Clarification of AAI-MGMC message," IEEE 802.16 Broadband Wireless Access Working Group, IEEE C802.16p-11/0295r2, Nov. 2011, 3 pages.

Nigam, et al., "[DEV] Addressing for 802.16p," IEEE 802.16 Broadband Wireless Access Working Group, IEEE C802.16p-rg-11/0043r1, Feb. 2011, 5 pages.

PCT International Application No. PCT/KR2012/005605, Notification of Transmittal of the International Search Report and the Written Opinion of the International Searching Authority, or Declaration dated Dec. 28, 2012, 9 pages.

LAN/MAN Standards Committee of the IEEE Computer Society, "WirelessMAN-Advanced Air Interface for Broadband Wireless Access Systems," DRAFT Amendment to IEEE Standard, P802.16p-11/0033 Oct. 2011, 63 pages.

Kim, et al., "Clean-up of some texts in 802.16p AWD," IEEE 802.16 Broadband Wireless Access Working Group, IEEE 802.16p-11/0114r2, May 2011, 4 pages.

* cited by examiner

METHOD AND APPARATUS FOR TRANSMITTING A MAC CONTROL MESSAGE IN WIRELESS ACCESS SYSTEM

CROSS-REFERENCE TO RELATED APPLICATIONS

This application is the National Stage filing under 35 U.S.C. 371 of International Application No. PCT/KR2012/005605, filed on Jul. 13, 2012, which claims the benefit of earlier filing date and right of priority to Korean Application No. 10-2012-0032314, filed on Mar. 29, 2012, and also claims the benefit of U.S. Provisional Application Ser. No. 61/568,157, filed on Dec. 8, 2011, the contents of which are all hereby incorporated by reference herein in their entirety

FIELD OF THE INVENTION

The present invention relates a wireless access system and, more particularly, to a method for transmitting a medium access control (MAC) message during a machine to machine communication and an apparatus supporting the same. Additionally, the present invention also relates to assignment (or allocation) A-MAP information elements included in a MAP message, which is being transmitted for the same.

RELATED ART OF THE FIELD

Hereinafter, a Machine to Machine environment according to the present invention will be briefly described.

Herein, a M2M (Machine to Machine) literally refers to a communication between an electronic device (or machine) and another electronic device (or machine). As a broader definition, M2M refers to a wireless or wired communication between electronic devices, or to a communication between a user-controlled device and a machine. However, recently, M2M has generally been defined as a wireless communication between an electronic device and another electronic device without any human involvement.

When the concept of M2M communication was first adopted in the early 1990's, M2M communication was merely understood and recognized as the concept of remotely controlled communication or telematics, and the related market was also limited to such concept. However, over the past few years, M2M communication has been under development at a remarkable rate and has now evolved to a market drawing worldwide attention. Most particularly, the M2M communication has greatly influenced diverse fields including Fleet Management, remote monitoring of devices and equipments, smart meter for measuring the operation time of a construction equipment installation and for automatically measuring the usage amount of heat or electricity in an applied market related to the POS (Point of Sales) and security. The M2M communication that is to be used in the future is expected to be used and applied for a wider scope of usage in association with the conventional mobile communication and high speed wireless internet or low power communication solutions, such as Wi-Fi and Zigbee, thereby becoming the basis for expanding its market domain to the B2C (Business to Customer) market, and not being limited only to the B2B (Business to Business) market.

In the age of M2M communication, all types of machines (or devices) equipped with a SIM (Subscriber Identity Module) card may perform data reception and transmission, thereby being capable of being remotely controlled and managed. For example, being applied to an extended range of devices and equipments, such as cars, trucks, trains, containers, vending machines, gas tanks, and so on, the M2M communication technology may be applied to an enormous range of application.

In the related art, a user equipment was generally managed in individual units. Therefore, a one-to-one communication was generally performed between a base station and a user equipment. For example, when it is assumed that a large number of M2M devices (or machines) each performs a one-to-one communication with the base station, a network overload is expected to occur due to an excessive amount signaling that is generated between each of the M2M devices and the base station. As described above, when the M2M communication is being extended and being performed at a vast range, an overhead occurring during the communication between the M2M devices or between the each of the M2M devices and the base station may become a problem.

Also, as the usage of the M2M devices is becoming more active, an environment having the general user equipments co-exist with the M2M devices may be configured. Therefore, when the conventional communication is used without any modification, a problem may occur in that the user equipment is be required to decode all of the messages respective to the M2M devices.

For example, if broadcast data or multicast data are transmitted from the base station as one-to-many messages, without any distinction between the M2M devices and the general user equipment, the general user equipment and the M2M devices are required to decode all of the broadcast data. Therefore, the power consumption level may be increased abruptly. Furthermore, the user equipment or each of the M2M devices may fail to receive the data, which the corresponding user equipment or the corresponding M2M device was initially intended to receive.

DETAILED DESCRIPTION OF THE INVENTION

Technical Objects

In order to resolve the above-described general technical problems, an object of the present invention is to provide an efficient communication method for M2M devices.

Another object of the present invention is to define M2M device dedicated messages and to provide a method for transmitting such messages.

A further object of the present invention is to provide methods for efficiently broadcasting dedicated messages for M2M devices by differentiating general user equipments and M2M devices, while ensuring maximum backward compatibility with the conventional technology.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

To achieve these objects and other advantages and in accordance with the purpose of the invention, as embodied and broadly described herein, the exemplary embodiments of the present invention provide diverse methods for transmitting a Medium Access Control (MAC) control message respective to an M2M device and apparatuses for supporting the same. Furthermore, the exemplary embodiments of the present invention also provide diverse methods for transmitting assignment A-MAP information elements included in a MAP message, which is being transmitted to perform the present invention.

In an aspect of the present invention, a method for transmitting a Medium Access Control (MAC) control message for an M2M device in a wireless access system may comprise steps of receiving a broadcast assignment map information element (BA A-MAP IE) including a function index field and broadcast assignment information, wherein the function index field indicates that the BA A-MPA IE carries the broadcast assignment information for the M2M device and the broadcast assignment information indicates a resource region to which the MAC control message is being transmitted; and receiving the MAC control message through the resource region which is indicated by the broadcast assignment information, when a cyclic redundancy check (CRC) bit masked to the BA A-MAP IE indicates that the BA A-MAP IE is for a M2M broadcast assignment. In this case, the CRC bit being masked to the BA A-MAP IE is configured to a 1-bit masking prefix, a 3-bit type indicator, and a 12-bit masking code and the masking code is used to mask the BA A-MAP IE for the M2M broadcast assignment.

In another aspect of the present invention, a method for transmitting a Medium Access Control (MAC) control message for an M2M device in a wireless access system may comprises steps of transmitting a broadcast assignment map information element (BA A-MAP IE) including a function index field and broadcast assignment information, wherein the function index field indicates that the BA A-MAP IE carries the broadcast assignment information for the M2M device and the broadcast assignment information indicates a resource region to which the MAC control message is being transmitted; and transmitting the MAC control message through the resource region which is indicated by the broadcast assignment information. In this case, a cyclic redundancy check (CRC) bit masked to the BA A-MAP IE indicates that the BA A-MAP IE is for a M2M broadcast assignment, the CRC bit being masked to the BA A-MAP IE is configured to a 1-bit masking prefix, a 3-bit type indicator, and a 12-bit masking code, and the masking code is used to mask the BA A-MAP IE for the M2M broadcast assignment.

In yet another aspect of the present invention, a M2M device for receiving a Medium Access Control (MAC) control message in a wireless access system may comprises a transmitter, a receiver, and a processor supporting a reception of the MAC control message.

At this point, the M2M device may be configured to receive a broadcast assignment map information element (BA A-MAP IE) including a function index field and broadcast assignment information by using the receiver, wherein the function index field indicates that the BA A-MAP IE carries the broadcast assignment information for the M2M device and the broadcast assignment information indicates a resource region to which the MAC control message is being transmitted; and receive the MAC control message through the resource region which is indicated by the broadcast assignment information by using the receiver, when a cyclic redundancy check (CRC) bit masked to the BA A-MAP IE indicates that the BA A-MAP IE is for a M2M broadcast assignment. In this case, the CRC bit being masked to the BA A-MAP IE is configured to a 1-bit masking prefix, a 3-bit type indicator, and a 12-bit masking code, the masking code is used to mask the BA A-MAP IE for the M2M broadcast assignment.

In a further aspect of the present invention, a base station for transmitting a Medium Access Control (MAC) control message in a wireless access system may comprises a transmitter, a receiver, and a processor for supporting a transmission of the MAC control message.

At this point, the base station is configured to transmit a broadcast assignment map information element (BA A-MAP IE) including a function index field and broadcast assignment information by using the transmitter, wherein the function index field indicates that the BA A-MAP IE carries the broadcast assignment information for the M2M device and the broadcast assignment information indicates a resource region to which the MAC control message is being transmitted; and transmit the MAC control message through the resource region which is indicated by the broadcast assignment information. In this case, a cyclic redundancy check (CRC) bit masked to the BA A-MAP IE indicates that the BA A-MAP IE is for a M2M broadcast assignment, the CRC bit being masked to the BA A-MAP IE is configured to a 1-bit masking prefix, a 3-bit type indicator, and a 12-bit masking code, and the masking code is used to mask the BA A-MAP IE for the M2M broadcast assignment.

In the various aspects of the present invention, the BA A-MAP IE may further include a subfunction index indicating whether the BA A-MAP IE includes ranging channel assignment information for the M2M device or broadcast assignment information for the M2M device.

Also, the broadcast assignment information may include at least one of a burst size field indicating a size of the MAC control message, a resource index field indicating an assignment position (allocation location) and allocation size of the resource region, a long TTI indicator field indicating a number of subframes spanned by the resource region, and a transmission format field indicating whether a time domain is being repeated.

Also, the masking prefix may be set to 0b0, the type indicator may be set to 0b010, and the masking code may correspond to a decimal value of 4094.

Also, the masking prefix may be set to 0b0, the type indicator may be set to 0b001, and wherein the masking code may correspond to a decimal value of 4095.

Also, the MAC control message may be an AAI-MTE-IND message or an AAI-MGMC message.

The above-described embodiments of the present invention are merely a portion of the preferred embodiments of the present invention. And, it is to be understood that both the foregoing general description and the following detailed description of the present invention are exemplary and explanatory and are intended to provide further explanation of the invention as claimed.

Advantageous Effects

According to the embodiments of the present invention, the present invention has the following advantages.

Firstly, an efficient communication may be performed with an M2M device.

Secondly, by using messages that are defined as M2M device dedicated messages, communication with M2M devices may be efficiently performed even in a situation where the M2M devices co-exist with general user equipments. Additionally, by having the general user equipments not decode the M2M device specific messages, unnecessary power consumption may be prevented.

Finally, while ensuring maximum backward compatibility with the conventional technology, the present invention may differentiate the general user equipments from the M2M device, so that the M2M device specific messages can be efficiently broadcasted.

Additional advantages, objects, and characteristics of the present application will be set forth in part in the description which follows and in part will become apparent to those having ordinary skill in the art upon examination of the following or may be learned from practice of the present application.

BRIEF DESCRIPTION OF THE DRAWINGS

The accompanying drawings, which are included to provide a further understanding of the invention and which are incorporated in and constitute a part of this application, illustrate embodiment(s) of the invention and together with the description serve to explain the principle of the invention.

BEST MODE FOR CARRYING OUT THE PRESENT INVENTION

Figure 1:
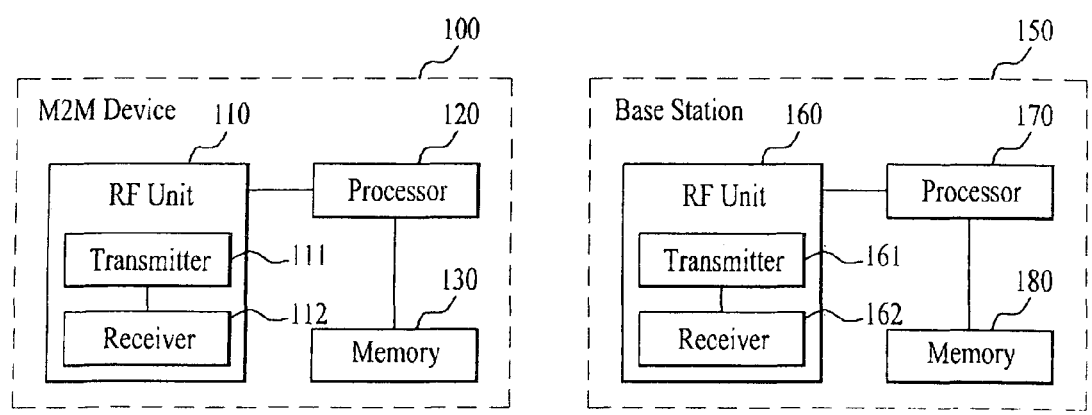
FIG. 1 illustrates a general view showing the configuration of devices, such as an M2M device, a base station, and so on, according to an exemplary embodiment of the present invention.

The exemplary embodiments of the present invention provide a method for transmitting a medium access control (MAC) control message in a machine to machine (M2M) communication, which is applied to a wireless access system and apparatuses supporting the same. Also, the exemplary embodiments of the present invention provide methods for transmitting assignment (or allocation) A-MAP information elements, which are included in a MAP message for transmitting such MAC control messages.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In order to avoid any ambiguity in the concept (or idea) of the present invention, some of the structures and devices disclosed (or mentioned) in the present invention may be omitted from the description of the accompanying drawings of the present invention. Also, any procedure or step that can be easily understood by anyone skilled in the art has also been excluded from the description of the present invention.

In the description of the present invention, the embodiments of the present invention will be described by mainly focusing on the data transmission and reception relation between a base station and a mobile station. Herein, the base station may refer to a terminal node of the network that performs direct communication with the mobile station. Occasionally, in the description of the present invention, particular operations of the present invention that are described as being performed by the base station may also be performed by an upper node of the base station.

More specifically, in a network consisting of multiple network nodes including the base station, diverse operations that are performed in order to communicate with the terminal may be performed by the base station or network nodes other than the base station. Herein, the term 'Base Station (BS)' may be replaced by other terms, such as fixed station, Node B, eNode B (eNB), ABS (Advanced Base Station), or Access Point (AP).

Additionally, the term 'MS (Mobile Station)' may be replaced by terms including UE (User Equipment), SS (Subscriber Station), MSS (Mobile Subscriber Station), Mobile Terminal, AMS (Advanced Mobile Station) or Terminal. Most particularly, in the description of the present invention, the mobile station may be used to have the same meaning as the M2M device.

Additionally, the transmitting end refers to a fixed and/or mobile node providing data services or audio services (or voice services), and the receiving end refers to a fixed and/or mobile node receiving data services or audio services (or voice services). Therefore, in an uplink, the mobile station may become the transmitting end, and the base station may become the receiving end. And, similarly, in a downlink, the mobile station may become the receiving end, and the base station may become the transmitting end.

The exemplary embodiments of the present invention may be supported by the standard documents that are disclosed in at least any one of the diverse wireless access systems, such as an IEEE 802.xx system, a 3GPP system, a 3GPP LTE system, and a 3GPP2 system. More specifically, among the exemplary embodiments of the present invention, reference may be made to the above-mentioned documents for the description of obvious process steps or elements of the present invention that have not been described herein.

Furthermore, all of the terms mentioned in the description of the present invention may be described and defined with reference to the standard documents. Most particularly, the exemplary embodiments of the present invention may be supported by at least one or more of the P802.16e-2004, P802.16e-2005, P802.16m, P802.16p, and P802.16.1b standard documents, which correspond to the standard documents for the IEEE 802.16 system.

Hereinafter, the preferred embodiments of the present invention will be described in detail with reference to the accompanying drawings. The detailed description of the present invention that is disclosed as follows with reference to the accompanying drawings is merely the description of exemplary embodiments of the present invention. And, therefore, the description of the present invention does not seek to represent a unique embodiment of the present invention.

Reference will now be made in detail to the preferred embodiments of the present invention, examples of which are illustrated in the accompanying drawings, so that anyone skilled in the art can easily implement the embodiments of the present invention. However, it will be apparent that the present invention may be implemented in a variety of different structures, and, therefore, the present invention will not be limited only to the exemplary embodiments presented herein.

Furthermore, in the accompanying drawings, in order to clearly describe the embodiments of the present invention, any parts irrelevant to the description of the present invention will be omitted. And, wherever possible, similar reference numbers will be used throughout the drawings to refer to the same or like parts.

Throughout the entire description of the present invention, when a particular part is said to "comprise (or include)" a specific element, unless specifically written or indicated otherwise, this does not signify that another element is excluded from the specific part but signifies that the specific part may also include other elements. Also, terms such as " . . . unit", " . . . device", " . . . module", and so on, which are indicated in the description of the present invention, indicates units that process at least one function or operation. And, this may be realized in the form of hardware or software, or a combination of hardware and software.

The specific terms used in the following embodiments of the present invention are provided to facilitate the understanding of the present invention. And, therefore, without deviating from the technical scope and spirit of the present invention, such specific terms may also be varied and/or replaced by other terms.

1. M2M Devices in General

Hereinafter, communication between M2M devices refers to a communication format, which is performed between user equipments passing through (or being connected with) the base station, or which is performed between a base station and user equipments without any human involvement, or refers to a communication format, which is performed between M2M devices. Therefore, an M2M Device refers to a user equipment that may be provided with support for performing communication with the above-described M2M devices.

An access service network for M2M services may be defined as an M2M ASN (M2M Access Service Network), and a network entity communicating with the M2M devices may be referred to as an M2M server. Herein, the M2M server performs M2M application and provides an M2M specific service for one or more M2M devices. An M2M feature corresponds to a characteristic (or feature) of an M2M application. And, herein, at least one or more features (or characteristics) are required for providing an application. An M2M device group refers to a group of M2M devices sharing at least one or more common characteristics (or features).

Within a consistent network, a number of devices communicating via M2M communication (i.e., such devices may be diversely referred to as M2M devices, M2M communication devices, MTC (Machine Type Communication) devices, and so on) may gradually increase in accordance with an increase in the respective Machine Application Type.

Herein, the Machine Application Types may include (1) security, (2) public safety, (3) tracking and tracing, (4) payment, (5) healthcare, (6) remote maintenance and control, (7) metering, (8) consumer device, (9) Fleet Management in an application market related to POS (Point of Sales) and security, (10) communication between devices in Vending Machines, (11) remote monitoring of machines and equipments, (12) Surveillance Video communication of surveillance cameras, and so on. However, the Machine Application types are not required to be limited only to the above-mentioned types. And, therefore, other variety of machine application types may also be applied herein.

As another characteristic of the M2M device, the M2M device has the characteristic of low mobility or the characteristic of scarcely once the corresponding M2M device is installed. More specifically, this signifies that the M2M device is stationary for a considerably long period of time. An M2M communication system may simplify or maximize mobility-related (or mobility-associated) operations for a specific M2M application having a fixed position, such as secured access surveillance, public safety, payment, remote maintenance and control, metering, and so on.

As described above, with the increase in the device application type, the number of M2M communication devices may drastically increase as compared to the number of general mobile communication devices. Therefore, when each of the above-described M2M communication devices individually performs communication with the base station, a critical load may occur in a wireless interface (or radio interface) and/or a network.

Hereinafter, the exemplary embodiment of the present invention will be described in detail based upon an exemplary case where the M2M communication is applied to a wireless communication system (e.g., P802.16e, P802.16m, P802.16.1b, P802.16p, and so on). However, the present invention will not be limited only to the examples given herein. And, therefore, the present invention may also be applied to other communication systems, such as 3GPP LTE/LTE-A systems.

FIG. 1 illustrates a general view showing the configuration of devices, such as an M2M device, a base station, and so on, according to an exemplary embodiment of the present invention.

Referring to FIG. 1, an M2M device (100) and a base station (150) may each include a radio frequency (RF) unit (110, 160), a processor (120, 170), and may selectively (or optionally) include a memory (130, 180). The example shown in FIG. 1 illustrates the structures of 1 M2M device and 1 base station. However, an M2M communication environment between multiple M2M devices and the base station may also be established.

Each RF unit (110, 160) may respectively include a transmitter (111, 161), and a receiver (112, 162). The transmitter (111) and the receiver (112) of the M2M device (100) may be configured to transmit and receive signals to and from the base station (150) and other M2M devices. And, the processor (120) may be functionally connected to the transmitter (111) and the receiver (112), so as to be capable of controlling the process performed by the transmitter (111) and the receiver (112) for transmitting and receiving signals to and from other devices. Additionally, the processor (120) may first perform diverse processes on the signal that is to be transmitted and, then, transmit the processed signal to the transmitter, and the processor (120) may also perform processes on the signal that is received by the receiver (112).

When required, the processor (120) may store information included in an exchanged message in the memory (130). And, by being configured of the above-described structure, the M2M device (100) may perform the method according to diverse exemplary embodiments of the present invention, which will hereinafter be described in detail.

Meanwhile, although it is not shown in FIG. 1, the M2M device (100) may include diverse additional configurations depending upon the respective device application type. For example, when the corresponding M2M device (100) is designated to perform smart metering, the corresponding M2M device (100) may include an additional configuration for performing power measurement. And, such power measuring operation may be controlled by the processor (120) shown in FIG. 1, and such power measuring operation may also be controlled by a separately configured processor (not shown).

Although FIG. 1 shows an example of a case when communication is performed between the M2M device (100) and the base station (150), the M2M communication method according to the present invention may also be performed between one or more M2M devices. And, being configured to have the same device configuration as the example shown in FIG. 1, each device may perform the method according to diverse exemplary embodiments of the present invention, which will hereinafter be described in detail.

The transmitter (161) and the receiver (162) of the base station (150) may be configured to transmit and receive signals to and from another base station, M2M server, and M2M devices. And, the processor (170) may be functionally connected to the transmitter (161) and the receiver (162), so as to be capable of controlling the process performed by the transmitter (161) and the receiver (162) for transmitting and receiving signals to and from other devices. Additionally, the processor (170) may first perform diverse processes on the signal that is to be transmitted and, then, transmit the processed signal to the transmitter, and the processor (170) may also perform processes on the signal that is received by the receiver (162). When required, the processor (170) may store information included in an exchanged message in the memory (130). And, by being configured of the above-described structure, the base station (150) may perform the method according to diverse exemplary embodiments of the present invention, which will hereinafter be described in detail.

The processor (120, 170) of each of the M2M device (110) and the base station (150) may direct the operations (e.g., control, adjustment, management, and so on) of each of the M2M device (110) and the base station (150). Each of the processors (120, 170) may be connected to the respective memory (130, 180) storing program codes and data. Each memory (130, 180) may be connected to the respective processor (120, 170), so as to store operating systems, applications, and general files.

The processor (120, 170) of the present invention may also be referred to as a controller, a microcontroller, a microprocessor, a microcomputer, and so on. Meanwhile, the processor (120, 170) may be implemented in the form of hardware or firmware, or software, or in a combination of hardware or firmware, and software. In case of implementing the embodiments of the present invention in the form of hardware, the processor (120, 170) may be equipped with ASICs (application specific integrated circuits) or DSPs (digital signal processors), DSPDs (digital signal processing devices), PLDs (programmable logic devices), FPGAs (field programmable gate arrays), and so on, which are configured to perform the present invention.

Meanwhile, in case of implementing the embodiments of the present invention in the form of firmware or software, the firmware or software may be configured to include a module, procedure, or function, which performs the above-described functions or operations of the present invention. And, the firmware or software, which is configured to perform the present invention may be provided in the processor (120, 170) or may be stored in the memory (130, 180), so as to be operated by the processor (120, 170).

2. Idle Mode

Hereinafter, an idle mode of an M2M environment in which the exemplary embodiments of the present invention are to be performed will be described in detail.

An idle mode refers to an operation mode operating a Paging Group, a Paging Cycle, and a Paging Offset for Power saving, when an M2M device (i.e., user equipment) does not receive any traffic from the base station for a predetermined period of time.

For example, a user equipment, which has shifted to the idle mode, may receive a broadcast message (e.g., paging message), which is broadcasted by the base station, only during an available interval for paging (or interval available for paging) during a paging cycle, so as to be capable of determining whether the corresponding user equipment should shift to a normal mode or whether the corresponding user equipment should maintain the idle mode.

Additionally, the idle mode corresponds to a mechanism allowing the user equipment to periodically receive a downlink message without being registered to a specific base station (i.e., without having to perform any procedure such as a handover process), even when the user equipment wanders around a vast range within a wireless (or radio) link environment including multiple base stations.

For simplicity in the description of the present invention, the idle mode will be described based upon IEEE 802.16e, 16m, and 16p systems. However, the technical spirit and scope of the present invention will not be limited only to the systems presented herein as the standard systems. In order to initiate a shift to the idle mode, the user equipment transmits a DREG-REQ (Deregistration Request) message to the base station, in order to request for a deregistration process from the corresponding base station. Thereafter, as a response to the DREG-REQ message, the base station transmits a DREG-RSP (Deregistration Response) message to the corresponding user equipment. At this point, the DREG-RSP message includes Paging Information. Herein, the initiation of the user equipment for shifting to the idle mode may be disclosed upon request from the base station in an unsolicited manner. In this case, the base station transmits the DREG-RSP message to the user equipment.

The Paging Information may include values for a Paging Cycle, a Paging Offset, a PGD (Paging Group IDentifier), and a Paging Listening Interval.

After receiving the DREG-RSP message from the base station, the user equipment refers to the paging information, so as to initiate its shift to the idle mode. The idle mode may include a Paging Cycle, and one paging cycle of the idle mode may be configured of a Paging Listening Interval and an Unavailable Interval. At this point, the Paging Listening Interval may be used as the same concept of an Available Interval or a paging interval.

A paging offset indicates a starting point (e.g., frame or subframe) at which the paging listening interval begins within the paging cycle. Also, a paging group identifier indicates an identifier of a paging group, which is allocated to the user equipment. Moreover, the paging information may include paging message offset information. Herein, the paging message offset information indicates a point at which the paging message is being transmitted from the base station.

Thereafter, the user equipment may use the paging information so as to receive a paging message, which is being transmitted to the corresponding user equipment during the paging listening interval. Herein, the paging message may be transmitted through the base station or a paging controller. More specifically, the user equipment may monitor a radio channel (or wireless channel) in accordance with the paging cycle in order to receive the paging message.

Figure 2:
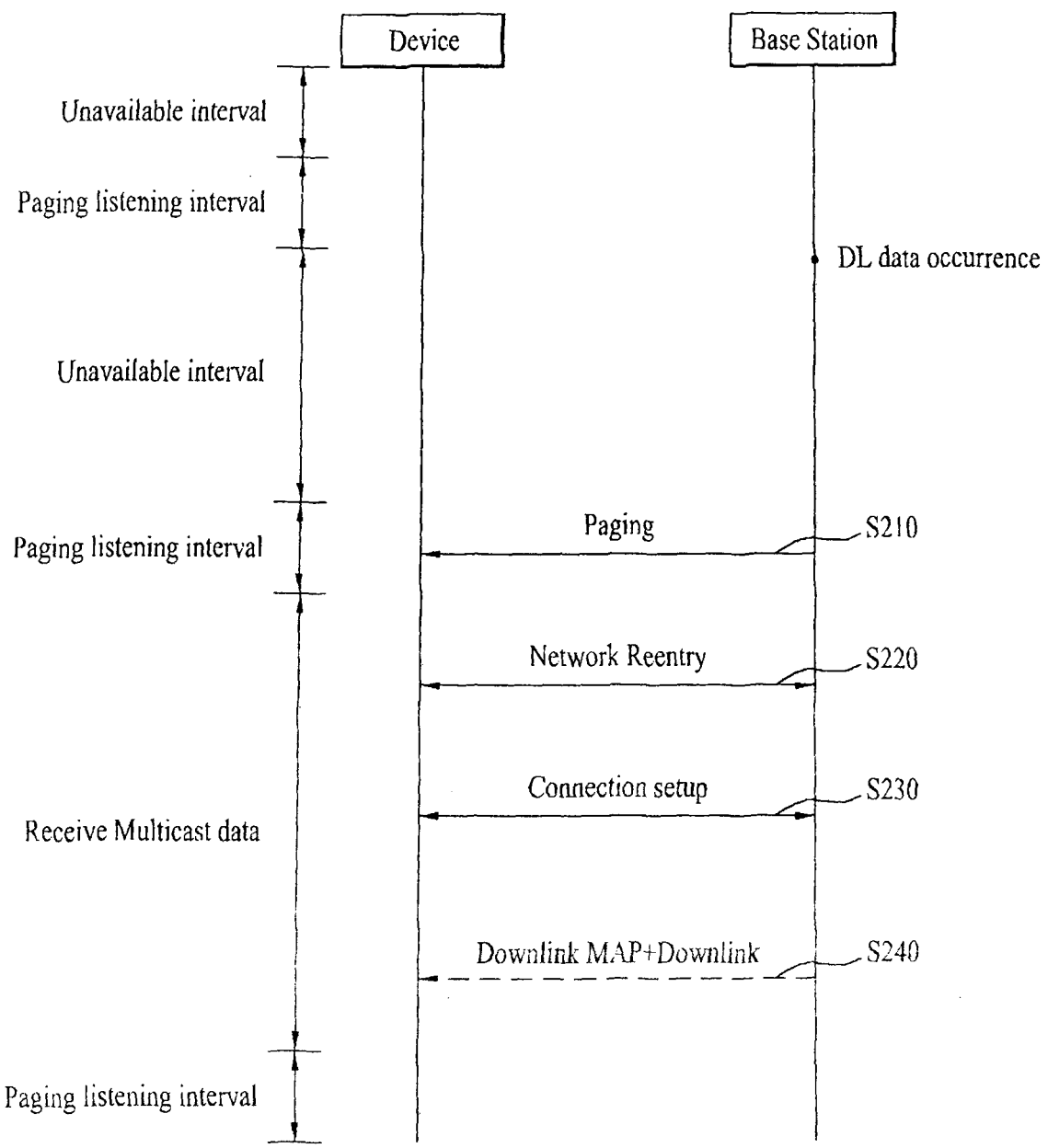
FIG. 2 illustrates a flow chart showing one of many paging methods being performing in an idle mode.

FIG. 2 illustrates a flow chart showing one of many paging methods being performing in an idle mode.

When data are generated in a user equipment, which is being operated in an idle mode, within a paging group to which a base station belongs, the corresponding base station may transmit a paging message to the corresponding user equipment, in order to notify the user equipment of the generated data. Then, the user equipment may receive the transmitted paging message during its paging listening interval, so as to verify the presence or absence of downlink (DL) data that are being delivered to the corresponding user equipment (S210).

If it is determined that downlink data exist (i.e., positive indication), the user equipment performs a ranging process including a network reentry process (S220). Thereafter, the user equipment performs a Connection Setup process, which determines (or sets-up) a connection to a downlink service flow, which is related to the base station, through a DSA (Dynamic Service Addition) process (S230).

After the connection to a service flow is determined (or set-up), the base station transmits downlink control information and downlink data respective to the corresponding service to the user equipment (S240).

In an M2M scenario, since most of the M2M devices do not correspond to a terminal that can be carried (or handheld) by a user, such as a general user equipment, e.g., mobile phones, an automatic application or firmware update process for the M2M devices may correspond to a main application within the M2M service scenario.

For example, in order to update the firmware of each device, an M2M server may transmit updated information to the M2M devices having the corresponding application. In order to transmit such multicast data, which are required to be commonly transmitted to M2M devices that are being operated in the idle mode, the base station shall page the corresponding M2M devices through the paging process, which is described above with reference to FIG. 2.

The user equipments that have been paged (or that have received the paging message) may initiate transmission of a random access code, so as to perform a network reentry process. Accordingly, by accessing (or being connected to) a network, the corresponding user equipments may receive DL traffic transmitted from the base station. However, such processes may increase an unnecessarily excessive usage of the network. Furthermore, in an environment where the M2M devices co-exist with the general user equipments, by having each of the M2M devices and the general user equipment receive unnecessary data, the power consumption level of each user equipment (or terminal) may be increased.

3. M2M Multicast Operations in an Idle Mode

The M2M base station may provide a multicast service while requesting for a network reentry of a M2M device, which is being operated in an idle mode, or without requesting for the network reentry of the corresponding M2M terminal. Before transmitting the downlink (DL) multicast data, the base station may transmit a paging message including a multicast traffic indication (or direction) to the M2M device during the paging listening interval. If the M2M device receives a paging message directing the corresponding M2M device to receive the multicast traffic without any network reentry, and if the corresponding paging message does not include any information on a Multicast Transmission Start Time, the corresponding M2M device may initiate the reception of the DL multicast data without terminating the idle mode.

The Multicast Transmission Start Time being included in the paging message indicates a start time (or starting point) at which the DL multicast data that are to be transmitted by the base station are transmitted. Herein, a value of the Multicast Transmission Start Time should be smaller than a start time value of a next paging listening interval of the M2M device, which has received the paging message (e.g., AAI-PAG-ADV). The M2M device may maintain its power in a power off state until a frame, which is indicated by the Multicast Transmission Start Time being included in the paging message. When the transmission of the multicast data is completed, the base station transmits an AAI-MTE-IND message to the corresponding M2M device. Herein, the M2M device may enter a paging unavailable interval as soon as the corresponding M2M device receives the AAI-MTE-IND message.

4. Medium Access Control (MAC) Control Message

Hereinafter, the MAC control messages that are used in the exemplary embodiments of the present invention will be described in detail.

(1) Broadcast Assignment A-MAP Information Element

A BA A-MAP IE (Broadcast Assignment A-MAP Information Element) is being transmitted for allocating a resource for a broadcast burst, a multicast burst, or an NS-RCH. Herein, a broadcast burst may include one or more broadcast MAC control messages. Table 1 shown below indicates one of many BA A-MAP IE structures that can be used in the exemplary embodiments of the present invention.

TABLE 1

| Statement | ize (bits) | Description |
|---|---|---|
| Broadcast_Assignment_A-MAP_IE( ){ | | |
|   A-MAP IE Type | | Broadcast Assignment A-MAP IE |
|   Function index | | 0b00: This IE carries broadcast assignment information |
| | | 0b01: This IE carries handover ranging channel allocation information |
| | | 0b10: This IE carries multicast assignment information |
| | | 0b11: Reserved |
|   If(Function index ==0b00){ | | |
|   Burst Size | | Burst size as indicated in the first 39 entries in Table 303 |
|   Resource Index | 1 | 512 FFT size: 0 in first 2 MSB bits + 9 bits for resource index |
| | | 1024 FFT size: 11 bits for resource index |
| | | 2048 FFT size: 11 bits for resource index |
| | | Resource index includes location and allocation size. |
|   Long TTI Indicator | | Indicates number of AAI subframes spanned by the allocated resource. |
| | | 0b0: 1 AAI subframe (default TTI) |
| | | 0b1: 4 DL AAI subframe for FDD or all DL AAI subframes for TDD (long TTI) |

TABLE 1-continued

| Statement | size (bits) | Description |
|---|---|---|
| Transmission Format | | 0b0: on time domain repetition |
| | | 0b1: with time domain repetition |
| If(Transmission format ==0b1){ | | |
| Repetition | | 0b00: no more repetition of the same burst |
| | | 0b01: the same burst shall be transmitted one more time. |
| | | 0b10: the same burst shall be transmitted two more times. |
| | | 0b11: the same burst shall be transmitted three more time. |
| Reserved | 3 | reserved bits |
| }else{ | | |
| Reserved | 5 | reserved bits |
| } | | |
| }else if(Function Index == 0b01){ | | |
| Number of Ranging Opportunities (N) | | 0: one NS-RCH |
| | | 1: two NS-RCHs |
| for(i=0; i<N; i++){ | | |
| Subframe Index | | |
| Ranging opportunity index | | Indicates 2-bit Opportunity index of the ranging channel specified in 6.2.15.3 |
| | | 0b0: 0b01 |
| | | 0b1: 0b10 |
| } | | |
| Reserved | 9/25 | |
| }else if (Function Index==0b01){ | | |
| Multicast Group ID | 2 | ID of a group that receives multicast assignment |
| Burst Size | | burst size as indicated in the first 39 entries in Table 307 |
| Resource Index | 1 | 512 FFT size: 0 in first 2 MSB bits + 9 bits for resource index |
| | | 1024 FFT size: 11 bits for resource index |
| | | 2048 FFT size: 11 bits for resource index |
| | | Resource index includes location and allocation size. |
| Long TTI indicator | | Indicates number of AAI subframes spanned by the allocated resource. |
| | | 0b0: 1 AAI subframe (default TTI) |
| | | 0b1: 4 DL AAI subframe for FDD or all DL AAI subframes for TDD (long TTI) |
| Reserved | | reserved bits |
| } | | |

The detailed operations of the fields included in the BA A-MAP IE are described in Table 1. In Table 1, when a Function Index indicates 0b00, this indicates that the corresponding BA A-MAP IE includes broadcast assignment information. And, when the Function Index is set to 0b10, this indicates that the corresponding BA A-MAP IE includes multicast assignment information.

More specifically, depending upon the set-up value of the function index, the BA A-MAP IE may further include resource assignment (or allocation) information for the corresponding broadcast transmission and/or multicast transmission (e.g., one or more of a Burst size field, a Resource Index (Resource Index) field, a Long TTI Indicator field, a Transmission format field, and a Multicast Group ID field).

A 16-bit CRC being applied to the BA A-MAP IE shown in Table 1 is generated in accordance with the contents included in the BA A-MAP IE. The CRC is masked to the BA A-MAP IE as a 16-bit CRC, which is generated in accordance with Table 2 shown below.

TABLE 2

| Masking Prefix (1 bit MSB) | Remaining 15 bit LSBs | |
|---|---|---|
| | Type Indicator | Masking Code |
| 0b0 | 0b000 | 12 bit STID or TSTID |
| | 0b001 | Refer to Table 193 |
| | 0b010 | Refer to Table 194 |
| 0b1 | | 15-bit RA-ID: The RA-ID is derived from the AMS's random access attributes [i.e., superframe number (LSB 5 bits). frame_index (2 bits). preamble code index for ranging or BR (6 bits) and opportunity index for ranging or BR. (2 bits)] as defined below; RA-ID = (LSB 5 bits of superframe number\| frame_index\| preamble_code_index\| opportunity_index) |

Referring to Table 2, among the 16 bits of the CRC, 1 most significant bit (MSB) is used as the Masking Prefix, and a Message Type Indicator uses 3 bits, and a Masking Code uses 12 bits in accordance with the Type Indicator. For example, when the Type Indicator is set to 0b000, the Masking Code uses a 12-bit STID (Station Identifier) or TSTID (Temporary STID). Furthermore, when the Type Indicator is set to 0b001, the Masking Code uses the value indicated in Table 3 shown below.

Table 3 indicates another example of a Masking Code for M2M broadcasting, when the Masking Prefix of Table 2 is set to 0b0, and when the Type Indicator is set to 0b001.

TABLE 3

| Decimal value | Description |
| --- | --- |
| 0 | Used to mask Broadcast Assignment A-MAP IE for broadcast or ranging channel assignment |
| 1 | Used to mask BR-ACK A-MAP IE |
| 2-128 | Used to mask Group Resource Allocation A-MAP IE (group ID) |
| Others | Reserved |

Referring to Table 3, the masking codes that are being used in accordance with each assignment A-MAP IE are marked in decimal values.

Referring back to Table 1 and Table 2, when the function index of the BA A-MAP IE is set up to 0b00 or 0b01, a 16-bit CRC having a Masking Prefix set to 0b0 and a message Type indicator set to 0b001 is masked to the BA A-MAP IE. If the function index is set to 0b10, a 16-bit CRC having the masking prefix of Table 2 set to 0b0 and a message Type indicator set to 0b010 is masked to the BAA-MAP IE.

In Table 1, an MGID (Multicast Group ID) corresponds to an identifier of a group receiving a multicast burst, and the identifier is assigned with a unique value within the base station (or ABS). Herein, the MGID may be assigned through a DSA process (DSA-REQ/RSP message) and may be modified (or altered) through a DSC process (DSC-REQ/RSP message).

Broadcast and multicast bursts that are being transmitted in accordance with the BA A-MAP IE may be transmitted by using an SFBC as a MIMO encoder format and a QPSK as a modulation scheme. However, a traffic indication message (AAI-TRF-IND), a paging message (AAI-PAG-ADV), and a paging information message (PG_Info) are not transmitted via time domain repetition. Other broadcast MAC control messages may be transmitted via time domain repetition. Herein, one repetition period of the time domain repetition corresponds to 1 frame.

During the repetition period according to which the broadcast burst is being repeatedly transmitted, other broadcast bursts may be transmitted only without the time domain repetition. When transmitting each broadcast burst via time domain repetition, the ABS transmits a BA A-MAP IE, in which a value of the number of remaining repetition times decreases by 1 after each transmission. More specifically, when the ABS performs a first transmission in a $k^{th}$ frame, when the value of the number of remaining repetition times is equal to N−1, the transmission process is completed in the $k+N-1^{th}$ frame. Furthermore, the value of the repetition field decreases by 1 after each transmission.

Among other fields of the BA A-MAP IE, only a resource index field is varied during the cycle period according to which the time domain repetition is performed. When transmitting the broadcast burst, the SPID is always set to '0'. And, when each of the Long TTI indicator field and the transmission format field is set to 1, the broadcast burst is not assigned (or allocated) in a frame where an SFH (Super Frame Header) is being transmitted.

(2) M2M Device Group MAC Control (AAI-MGMC) Message

Hereinafter, an AAI-MGMC (M2M device Group MAC Control) message, which may be used in the exemplary embodiment of the present invention will be described in detail.

The AAI-MGMC message is being transmitted to a group of user equipments (i.e., M2M devices), each belonging to the same M2M device group, for the parameters and/or for indication. The ABS may transmit an AAI-MGMC message to the user equipments, which are in a connection state other than the idle mode, by using a broadcast method or a multicast method.

Table 4 shown below shows a list of exemplary MAC control messages

TABLE 4

| No. | Function Region | Name of Message | Message Description | Security | Connection |
| --- | --- | --- | --- | --- | --- |
| 70 | RELAY | AAI-ARS-CONFIG-CMD | ARS Configuration Command | N/A | Unicast |
| 72 | M2M | AAI-MGMC | M2M Device group MAC control | N/A | Broadcast |
| 73-255 | | | Reserved | | |

Table 5 shown below shows an AAI-MGMC message format.

TABLE 5

| Field | size (bits) | Description | Condition |
| --- | --- | --- | --- |
| Action Code | | Used for identifying the purpose of the corresponding message 0b00: MGID reassignment value 0b01-0b11: reserved | |
| If(Action Code==0x00){ for(i=1;i<=Num_MGID; i++){ | | Number of MGIDs that are to be updated | Exists when the MGID is required to be updated |
| Current MGID | 2 | Current MGID value | |
| New MGID | 2 | New MGID value that is to be allocated | |

TABLE 5-continued

| Field | Size (bits) | Description | Condition |
|---|---|---|---|
| M2M Group Zone Index | | M2M_Group_Zone_Index corresponding to an M2M_GROUP_ZONE_ID, to which the MGID belongs | |
| } | | | |
| } | | | |

The base station uses an AAI-MGMC message including an MGID in order to transmit information respective to multiple user equipments (e.g., M2M devices). When the AAI-MGMC message is transmitted by using the broadcast method, a physical layer (PHY) layer accompanying the AAI-MGMC message is transmitted in accordance with the BA A-MAP IE.

If the AAI-MGMC message is carried by control information respective to a single M2M device group, and if a multicast SA (Security Association) is set-up for the corresponding M2M device group, the AAI-MGMC message may be encrypted by using the corresponding multicast SA. A PHY burst including a MAC PDU (Medium Access Control Protocol Data Unit), which carries the AAI-MGMC message for a single M2M device group, may be indicated by an M2M group assignment A-MAP IE. And, an FID of the MAC PDU, which accompanies an AAI-MGMC message that is either encrypted or not encrypted, may respectively set to 0 or 1. The user equipment transmits an AAI-MSG-ACK message to the base station as a response to the AAI-MGMC message.

(3) Multicast Transmission End Indication (AAI-MTE-IND) Message

Hereinafter, an AAI-MTE-IND (Multicast Transmission End Indication) message that may be used by the exemplary embodiments of the present invention will be described in detail.

While the base station transmits a multicast message to a user equipment, which is being operated in an idle mode, when there is no multicast message that is to be transmitted to the user equipment (M2M device), the base station may use the MGID to transmit the AAI-MTE-IND message to the user equipment by using the broadcast method or the multicast method. When the user equipment operating in the idle mode receives the AAI-MTE-IND message, the corresponding user equipment re-enters a paging unavailable interval.

Table 6 shown below shows an exemplary AAI-MTE-IND message format that is used in the exemplary embodiments of the present invention.

TABLE 6

| Field | Size (bits) | Value/Contents | Condition |
|---|---|---|---|
| MGID | 12 | MGID related to multicast traffic | |
| M2M Group Zone Index | 2 | M2M Group Zone Index corresponding to an M2M Group Zone Identifier to which the MGID belongs. | |

Referring to Table 6, the AAI-MTE-IND message includes an MGID field, which indicates the corresponding multicast traffic, and an M2M Group Zone Index, which corresponds to an M2M Group Zone Identifier to which the MGID belongs. When the AAI-MTE-IND message is being transmitted by using the broadcast method, a physical layer (PHY) burst accompanying the AAI-MTE-IND message may be transmitted in accordance with the BA a-MAP IE.

If the AAI-MTE-IND message is accompanied by control information respective to a single M2M device group, and if a multicast SA (Security Association) is set-up for the corresponding M2M device group, the AAI-MTE-IND message may be encrypted by using the corresponding multicast SA. A MAC PDU (Medium Access Control Protocol Data Unit), which accompanies the AAI-MGMC message respective to a single M2M device group, may be indicated by an M2M group assignment A-MAP IE. And, an FID of the MAC PDU, which accompanies an AAI-MTE-IND message that is either encrypted or not encrypted, may respectively set to 0 or 1. When the user equipment operating in the idle mode receives the AAI-MTE-IND message, the corresponding user equipment re-enters a paging unavailable interval.

5. Method for Transmitting M2M Broadcast MAC Control Message

Hereinafter, the exemplary embodiments of the present invention that reflect the technical characteristics and features of the present invention, which are described above in section 1 to section 4, will be described in detail.

In an M2M multicast service, an AAI-MTE-IND message is defined as a message, which is being transmitted in order to notify the end (or completion) of a multicast traffic. And, an AAI-MGMC message is defined in order to simultaneously update an M2MCID for all user equipments belonging to the same group. The corresponding messages may be transmitted from the base station by using the broadcast method or the multicast method. And, in a CRC of a conventional BA A-MAP IE delivering such messages may include a masking prefix, which is set to '0', and a type indicator, which is set to '0b001'. And, the CRC of the conventional BA A-MAP IE may be masked by a 16-bit CRC, which includes a masking code set to '0'. At this point, a function index of the BA A-MAP IE has been set to '0b00'. In this case, the messages that are conventionally transmitted were not differentiated as messages corresponding to M2M devices and general user equipments, but were only differentiated as messages being transmitted via multicast transmission or broadcast transmission.

As described above, when the AAI-MTE-IND message or the AAI-MGMC message is transmitted via broadcast transmission, not only the M2M devices but also the general user equipments (e.g., AMSs and MS/SSs) decode the broadcast messages designated for the M2M communication. This may least to an unnecessary (or excessive) increase in a broadcast burst decoding overhead.

Therefore, the exemplary embodiments of the present invention, which will hereinafter be described in detail, provide diverse methods enabling only the M2M devices to receive M2M specific broadcast MAC control messages (e.g., AAI-MTE-IND or AAI-MGMC), which are transmitted from the base station in order to minimize the effects (or influence) caused to the conventional general user equipments due to the adoption of the M2M system.

The exemplary embodiments of the present invention either assign specific IDs for the M2M devices or use broadcast masking codes designated only to the M2M devices. For example, a specific masking code is assigned to the M2M devices for broadcast transmission.

Table 7 shown below shows an exemplary masking code for broadcast transmission, when the Masking Prefix of Table 2 is 0b0, and when the Type indicator is 0b010.

TABLE 7

| Decimal Value | Contents |
|---|---|
| 4094 | Used to mask Broadcast Assignment A-MAP IE for M2M broadcast Assignment (i.e., Function Index = 0b11) |
| 4095 | Used to mask Broadcast Assignment A-MAP IE for multicast Assignment (i.e., Function Index = 0b10) |
| others | Reserved |

Referring to Table 7, the decimal value 4094 of the masking code is masked to the BA A-MAP IE in order to indicate that the corresponding BA A-MAP IE is being transmitted for M2M broadcast assignment. Additionally, the decimal value 4095 of the masking code is masked to the BA A-MAP IE in order to indicate that the corresponding BA A-MAP IE is being transmitted for the general multicast assignment. That is, 4094 indicates an M2M broadcast assignment identifier, and 4095 indicates a multicast assignment identifier.

More specifically, by decoding only a BA A-MAP IE having a 16-bit CRC masked thereto, wherein the 16-bit CRC is configured with a masking prefix of 0b0, a type indicator of 0010, and a masking code of 4094, the M2M device may recognize the corresponding BA A-MAP IE as a BA A-MAP IE designated for M2M broadcasting assignment. Furthermore, the general user equipment de-masks the CRC of the corresponding IE, so that decoding is no longer performed on the corresponding message, when it is determined that the corresponding message is designated for the M2M device.

Table 8 shown below shows another exemplary masking code for M2M broadcasting, when the Masking Prefix of Table 2 is 0b0, and when the Type indicator is 0b011.

TABLE 8

| Decimal Value | Contents |
|---|---|
| 0 | Used to mask Broadcast Assignment A-MAP IE for broadcast or ranging channel Assignment |

TABLE 8-continued

| Decimal Value | Contents |
|---|---|
| 1 | Used to mask BA-ACK A-MAP IE |
| 2-128 | Used to mask Group Resource Allocation A-MAP IE (Group IE) |
| 4095 | Used to mask Broadcast Assignment A-MAP IE for M2M Broadcast assignment |
| others | Reserved |

Referring to Table 8, among the 12-bit masking codes, decimal values 0-128 correspond to values that are already assigned for other purposes. For example, 0 is masked to the BA A-MAP IE for broadcast assignment or ranging assignment. 1 is masked to the BA ACK A-MAP IE. And, 2-128 are masked to the GRA A-MAP IE, as a group identifier. Therefore, in the exemplary embodiments of the present invention, among the reserved masking codes from 129 to 4095, the last decimal value 4095 may be masked to the BA A-MAP IE, which is designated for M2M broadcast assignment.

More specifically, by decoding only a BA A-MAP IE having a 16-bit CRC masked thereto, wherein the 16-bit CRC is configured of a masking prefix of 0b0, a type indicator of 0b001, and a masking code of 4095, the M2M device may recognize the corresponding BA A-MAP IE as a BA A-MAP IE designated for M2M broadcasting. Furthermore, the general user equipment de-masks the CRC of the corresponding IE, so that decoding is no longer performed on the corresponding message, when it is determined that the corresponding message is designated for the M2M device.

As shown in Table 7 and Table 8, when a specific masking code is being used for the purpose of M2M broadcasting, a function index field of the BA A-MAP IE designated for transmitting an M2M broadcasting message (e.g., AAI-MTE-IND message or AAI-MGMC message) may use the conventional value without any modification.

For example, when a mask configured of a type indicator being set to 0b010 and a masking code being set to 4094 is masked to the CRC of the BA A-MAP IE, the base station may set the function index field of Table 1 to 0b00, and the base station may broadcast the resource assignment information corresponding to the function index 0b00 by including the resource assignment information in the BA A-MAP IE.

Alternatively, when a specific masking code is being used for the purpose of M2M broadcasting, as shown in Table 7 and Table 8, the function index field of the BA A-MAP IE designated for transmitting an M2M broadcasting message (e.g., AAI-MTE-IND message or AAI-MGMC message) may use the conventional value without any modification.

Table 9 shown below shows one of many formats of a newly defined BA A-MAP IE in the exemplary embodiments of the present invention.

TABLE 9

| Statement | ize (bits) | Description |
|---|---|---|
| Broadcast_Assignment_A-MAP_IE( ){ | | |
| A-MAP IE Type | | Broadcast Assignment A-MAP IE |
| Function index | | 0b00: This IE carries broadcast assignment information |
| | | 0b01: This IE carries handover ranging channel allocation information |

TABLE 9-continued

| Statement | size (bits) | Description |
|---|---|---|
| | | 0b10: This IE carries multicast assignment information<br>0b11: This IE carries ranging channel allocation information for M2M devices or broadcast assignment information for M2M devices |
| ... | | ... |
| else{ //Function Index == 0b11<br>  Subfunction Index | | 0b0: Ranging channel assignment information for M2M devices<br>0b1: Broadcast assignment information for M2M devices |
|   If (Subfunction Index = 0b0) {<br>    Number of Ranging Opportunities (N)<br>    for(i=0; i<N; i++) {<br>      Subframe Index | | 0: one NS-RCH<br>1: two NS-RCHs |
|       Ranging opportunity index | | Indicates 2-bit Opportunity index of the ranging channel specified in 16.2.15.3.<br>0b0: 0b01<br>0b1: 0b10 |
|       Dedicated ranging indicator | | 0: this ranging channel is used for purpose of normal ranging<br>1: this ranging channel is used for the purpose of dedicated ranging indicated in the AAI-PAG-ADV message |
|     }<br>    Reserved<br>  }else { | 7/2 | |
|     Burst Size | | Burst size as indicated in the first 39 entries in Table 303 |
|     Resource Index | 1 | 512 FFT size: 0 in first 2 MSB bits + 9 bits for resource index<br>1024 FFT size: 11 bits for resource index<br>2048 FFT size: 11 bits for resource index<br>Resource index includes location and allocation size. |
|     Long TTI Indicator | | Indicates number of AAI subframes spanned by the allocated resource.<br>0b0: 1 AAI subframe (default TTI)<br>0b1: 4 UL AAI subframes for FDD or all UL subframes for TDD (Long TTI) |
|     Transmission Format | | 0b0: no time domain repetition<br>0b1: with time domain repetition |
|     If (Transmission Format==0b1){<br>      Repetition | | 0b00: no more repetition of the same burst<br>0b01: the same burst shall be transmitted one more time<br>0b10: the same burst shall be transmitted two more times<br>0b11: the same burst shall be transmitted three more times |
|       Reserved<br>    }else { | 2 | Reserved bits |
|       Reserved<br>    }<br>  }<br>  }<br>  }<br>} | 4 | Reserved bits |

Referring to Table 9, it may be verified that a 2-bit Function Index field is newly defined and included in the BA A-MAP IE. For example, a reserved value 0b11 of the conventional function index field may be newly defined. More specifically, 0b11 of the function index field may indicate that the BA A-MAP IE carries broadcast assignment information for the M2M devices or ranging channel assignment information for the M2M devices.

Therefore, when the function index field of the BA A-MAP IE is assigned with 0b11, the BA A-MAP IE may further include a 1-bit Subfunction index field. And, when the subfunction index field value is 0b0, this may indicate that the ranging channel assignment information for the M2M devices is included in the BA A-MAP IE. And, when the subfunction index field value is 0b1, this may indicate that the broadcast assignment information for the M2M devices is included in the BA A-MAP IE.

Referring to Table 9, the BA A-MAP IE may further include the channel assignment information, when the subfunction index field is set to 0b0. The channel assignment information may include a Number of Ranging Opportunities (Number of Ranging Opportunities) field, a subframe index field, a Ranging Opportunity Index field indicating an Opportunity index of a ranging channel, and a Dedicated Ranging Indicator field indicating whether the corresponding ranging is a dedicated ranging or a general ranging.

The BA A-MAP IE may further include the broadcast assignment information, when the subfunction index field is set to 0b1. The broadcast assignment information may include a Burst Size field indicating the size of a MAC control message, a Resource Index field indicating the assignment position (or, allocation location) and a allocation size of a resource region to which the MAC control message is being transmitted, a Long TTI Indicator field indicating the number of AAI subframes being occupied by the assigned resource region, and a Transmission Format field indicating whether or not a time domain is being repeated. At this point, when the transmission format field is set to 0b1, the broadcast assignment information may further include a Repetition field indicating a number of repeated transmissions.

Figure 3:
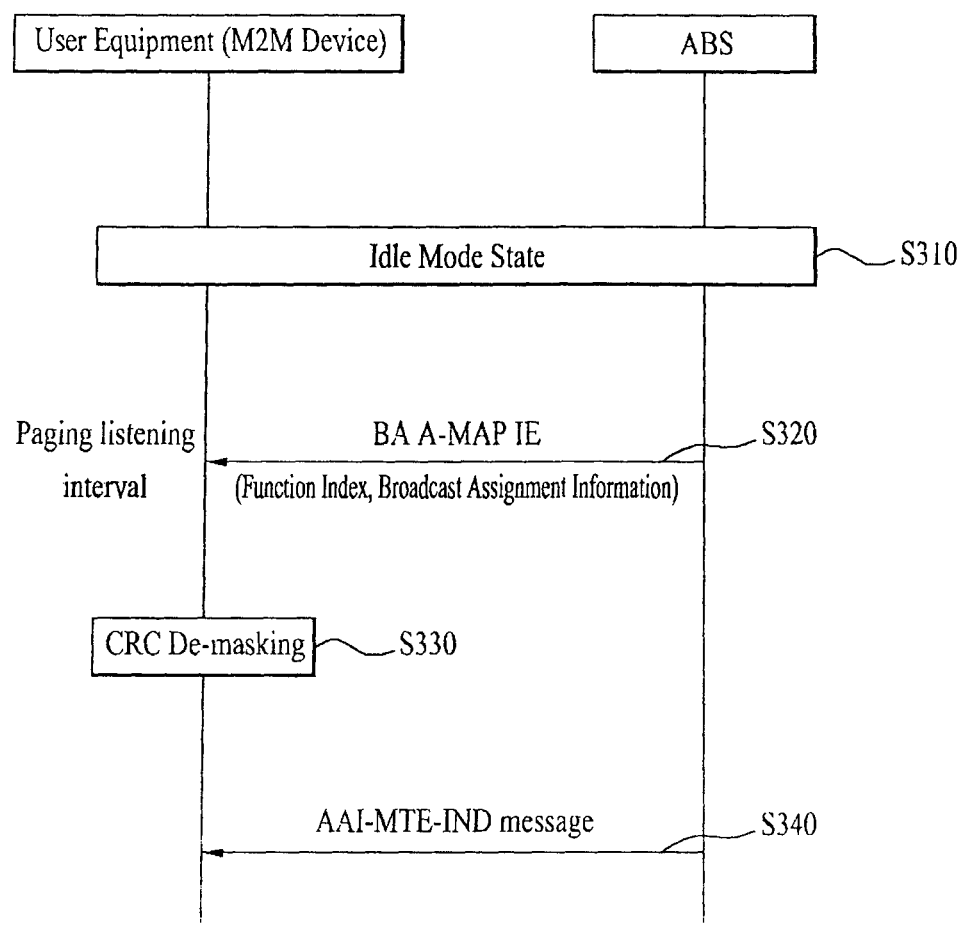
FIG. 3 illustrates one of many methods for transmitting a broadcast MAC control message for an M2M device according to an exemplary embodiment of the present invention.

FIG. 3 illustrates one of many methods for transmitting a broadcast MAC control message for an M2M device according to an exemplary embodiment of the present invention.

In FIG. 3, the M2M device is currently in an idle mode state. Reference may be made to the description of the idle mode of section 1 and to FIG. 2 for the detailed description of the idle mode operation (S310).

The base station may transmit a BA A-MAP IE, which includes broadcast assignment information for transmitting broadcast MAC control messages for M2M devices operating in the idle mode, to the corresponding M2M devices in a paging listening interval by using a broadcasting format. At this point, the function index of the BA A-MAP IE may be set to 0b11, and the subfunction index may be set to 0b1 (S320).

In step S320, the BA A-MAP IE may have the format described in Table 6, and the BA A-MAP IE may be masked to a 16-bit CRC, which includes the masking code described in Table 2 to Table 8. For example, a masking prefix of the 16-bit CRC may be set to 0b0, a type indicator may be set to 0b010, and a decimal value of the masking code may be set to 4094. Alternatively, a masking prefix of the 16-bit CRC may be set to 0b0, a type indicator may be set to 0b001, and a decimal value of the masking code may be set to 4095.

During the paging listening interval, the M2M device that has received the BA A-MAP IE of step S320 may de-mask the CRC, so as to determine that the corresponding IE belongs to the M2M device. Accordingly, the M2M device may decode the BA A-MAP IE and may receive an AAI-MTE-IND message, which corresponds to a MAC control message, through an allocation region indicated by the broadcast assignment information included in the BAA-MAP IE (S330, S340).

The AAI-MTE-IND message being transmitted in step S340 corresponds to a MAC control message indicating the end of the multicast data transmission. Therefore, the M2M device that has received the AAI-MTE-IND message may enter the paging unavailable interval, thereby preventing excessive power consumption.

If a general user equipment which is not the M2M device has received the BA A-MAP IE of step S320, the corresponding general user equipment may de-mask the CRC, so as to determine whether the corresponding IE belongs to the general user equipment. At this point, if the CRC is determined to belong to a M2M device, the general user equipment no longer performs decoding on the corresponding BA A-MAP IE and does not receive the AAI-MTE-IND message.

Figure 4:
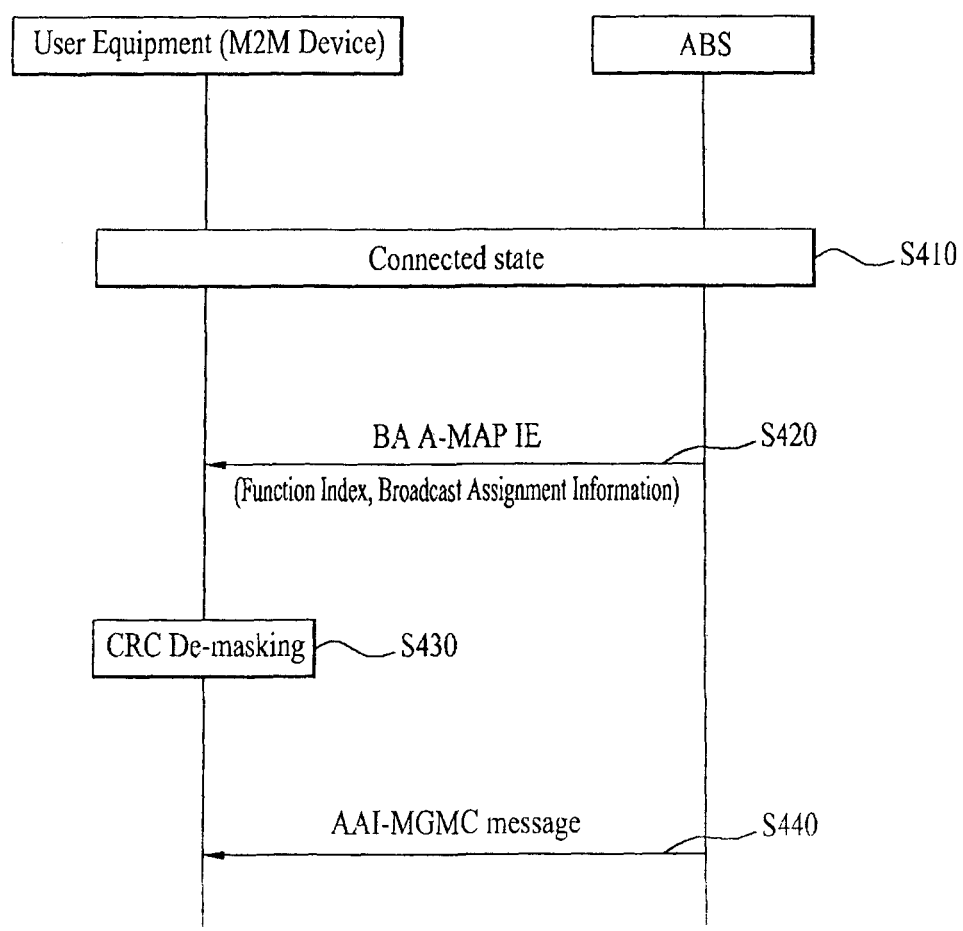
FIG. 4 illustrates another one of many methods for transmitting a broadcast MAC control message for an M2M device according to an exemplary embodiment of the present invention.

FIG. 4 illustrates another one of methods for transmitting a broadcast MAC control message for an M2M device according to an exemplary embodiment of the present invention.

In FIG. 4, the M2M device is currently in a general mode state. That is, the M2M device does not operate in the idle mode and is in a Connected State with the base station (S410).

The base station may transmit a BA A-MAP IE, which includes broadcast assignment information for transmitting broadcast MAC control messages for M2M devices operating in the connected state, to the corresponding M2M devices. At this point, the function index of the BA A-MAP IE may be set to 0b11, and the subfunction index may be set to 0b1 (S420).

In step S420, the BA A-MAP IE may have the format described in Table 6, and the BA A-MAP IE may be masked to a 16-bit CRC, which includes the masking code described in Table 2 to Table 3, Table 7, and Table 8. For example, a masking prefix of the 16-bit CRC may be set to 0b0, a type indicator may be set to 0b010, and a decimal value of the masking code may be set to 4094. Alternatively, a masking prefix of the 16-bit CRC may be set to 0b0, a type indicator may be set to 0b001, and a decimal value of the masking code may be set to 4095.

The M2M device that has received the BA A-MAP IE of step S420, wherein the BA A-MAP IE operates in the connected state, may de-mask the CRC, so as to determine whether the corresponding IE belongs to the M2M device. Accordingly, the M2M device may decode the BA A-MAP IE and may receive an AAI-MGMC message, which corresponds to a MAC control message, through an assignment region indicated by the broadcast assignment information included in the BAA-MAP IE (S430, S440).

If a general user equipment has received the BA A-MAP IE of step S420, the corresponding general user equipment may de-mask the CRC, so as to determine whether the corresponding IE belongs to the general user equipment. At this point, if the CRC is determined to belong to a M2M device, the general user equipment no longer performs decoding on the corresponding BA A-MAP IE and does not receive the AAI-MGMC message.

Furthermore, the present invention may be realized in another concrete configuration (or formation) without deviating from the scope and feature of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The above-described embodiments of the present invention may be applied to a wide range of wireless access systems. Examples of the diverse wireless access systems may include 3GPP (3rd Generation Partnership Project) systems, 3GPP2 systems, and/or IEEE 802.xx (Institute of Electrical and Electronic Engineers 802) systems, and so on. In addition to the diverse wireless access systems, the exemplary embodiments of the present invention may also be applied to all technical fields applying and adopting the diverse wireless access systems.

The invention claimed is:

1. A method for receiving a Medium Access Control (MAC) control message for an M2M device in a wireless access system, the method comprising:

receiving, by the M2M device, a broadcast assignment map information element (BA A-MAP IE) including a function index field and broadcast assignment information, wherein the function index field indicates that the BA A-MPA IE carries the broadcast assignment information for the M2M device and the broadcast assignment information indicates a resource region to which the MAC control message is being transmitted; and receiving, by the M2M device, the MAC control message through the resource region which is indicated by the broadcast assignment information, when a cyclic redundancy check (CRC) bit masked to the BA A-MAP IE indicates that the BA A-MAP IE is for a M2M broadcast assignment, wherein the CRC bit being masked to the BA A-MAP IE is configured to a 1-bit masking prefix, a 3-bit type indicator, and a 12-bit masking code, and wherein the masking code is used to mask the BA A-MAP IE for the M2M broadcast assignment.

2. The method of claim 1, wherein the BA A-MAP IE further comprises a subfunction index indicating whether the BA A-MAP IE includes ranging channel assignment information for the M2M device or broadcast assignment information for the M2M device.

3. The method of claim 1, wherein the broadcast assignment information includes at least one of a burst size field indicating a size of the MAC control message, a resource index field indicating an allocation location and an allocation size of the resource region, a long TTI indicator field indicating a number of subframes spanned by the resource region, and a transmission format field indicating whether a time domain is being repeated.

4. The method of claim 1,
wherein the masking prefix is set to 0b0, and
wherein the type indicator is set to 0b010 and the masking code corresponds to a decimal value of 4094, or
wherein the type indicator is set to 0b001 and the masking code corresponds to a decimal value of 4095.

5. The method of claim 1, wherein the MAC control message is an AAI-MTE-IND message or an AAI-MGMC message.

6. A method for transmitting a Medium Access Control (MAC) control message for an M2M device in a wireless access system, the method comprising:

broadcasting, by a base station, a broadcast assignment map information element (BA A-MAP IE) including a function index field and broadcast assignment information, wherein the function index field indicates that the BA A-MAP IE carries the broadcast assignment information for the M2M device and the broadcast assignment information indicates a resource region to which the MAC control message is being transmitted; and transmitting, by the base station, the MAC control message through the resource region which is indicated by the broadcast assignment information, wherein a cyclic redundancy check (CRC) bit masked to the BA A-MAP IE indicates that the BA A-MAP IE is for a M2M broadcast assignment, wherein the CRC bit being masked to the BA A-MAP IE is configured to a 1-bit masking prefix, a 3-bit type indicator, and a 12-bit masking code, and wherein the masking code is used to mask the BA A-MAP IE for the M2M broadcast assignment.

7. The method of claim 6, wherein the BA A-MAP IE further comprises a subfunction index indicating whether the BA A-MAP IE includes ranging channel assignment information for the M2M device or broadcast assignment information for the M2M device.

8. The method of claim 6, wherein the broadcast assignment information includes at least one of a burst size field indicating a size of the MAC control message, a resource index field indicating an allocation location and an allocation size of the resource region, a long TTI indicator field indicating a number of subframes spanned by the resource region, and a transmission format field indicating whether a time domain is being repeated.

9. The method of claim 6, wherein the masking prefix is set to 0b0, and
wherein the type indicator is set to 0b010 and the masking code corresponds to a decimal value of 4094, or
wherein the type indicator is set to 0b001 and the masking code corresponds to a decimal value of 4095.

10. The method of claim 6, wherein the MAC control message is an AAI-MTE-IND message or an AAI-MGMC message.

11. A M2M device for receiving a Medium Access Control (MAC) control message in a wireless access system, the M2M device comprising:
a transmitter;
a receiver; and
a processor supporting a reception of the MAC control message,
wherein the M2M device is configured to:
receive a broadcast assignment map information element (BA A-MAP IE) including a function index field and broadcast assignment information by using the receiver, wherein the function index field indicates that the BA A-MAP IE carries the broadcast assignment information for the M2M device and the broadcast assignment information indicates a resource region to which the MAC control message is being transmitted; and
receive the MAC control message through the resource region which is indicated by the broadcast assignment information by using the receiver, when a cyclic redundancy check (CRC) bit masked to the BA A-MAP IE indicates that the BA A-MAP IE is for a M2M broadcast assignment,
wherein the CRC bit being masked to the BA A-MAP IE is configured to a 1-bit masking prefix, a 3-bit type indicator, and a 12-bit masking code, and
wherein the masking code is used to mask the BA A-MAP IE for the M2M broadcast assignment.

12. The M2M device of claim 11, wherein the BA A-MAP IE further comprises a subfunction index indicating whether the BA A-MAP IE includes ranging channel assignment information for the M2M device or broadcast assignment information for the M2M device.

13. The M2M device of claim 11, wherein the broadcast assignment information includes at least one of a burst size field indicating a size of the MAC control message, a resource index field indicating an allocation location and an allocation size of the resource region, a long TTI indicator field indicating a number of subframes spanned by the resource region, and a transmission format field indicating whether a time domain is being repeated.

14. The M2M device of claim 11, wherein
the masking prefix is set to 0b0, and
wherein the type indicator is set to 0b010 and the masking code corresponds to a decimal value of 4094, or
wherein the type indicator is set to 0b001 and the masking code corresponds to a decimal value of 4095.

15. The M2M device of claim 11, wherein the MAC control is an AAI-MTE-IND message or an AAI-MGMC message.

16. A base station for transmitting a Medium Access Control (MAC) control message in a wireless access system, the base station comprising:
a transmitter;
a receiver; and
a processor for supporting a transmission of the MAC control message,
wherein the base station is configured to:
transmit a broadcast assignment map information element (BA A-MAP IE) including a function index field and broadcast assignment information by using the transmitter, wherein the function index field indicates that the BA A-MAP IE carries the broadcast assignment information for the M2M device and the broadcast assignment information indicates a resource region to which the MAC control message is being transmitted; and
transmit the MAC control message through the resource region which is indicated by the broadcast assignment information,
wherein a cyclic redundancy check (CRC) bit masked to the BA A-MAP IE indicates that the BA A-MAP IE is for a M2M broadcast assignment,
wherein the CRC bit being masked to the BA A-MAP IE is configured to a 1-bit masking prefix, a 3-bit type indicator, and a 12-bit masking code, and
wherein the masking code is used to mask the BA A-MAP IE for the M2M broadcast assignment.

17. The base station of claim 16, wherein the BA A-MAP IE further comprises a subfunction index indicating whether the BA A-MAP IE includes ranging channel assignment information for the M2M device or broadcast assignment information for the M2M device.

18. The base station of claim 16, wherein the broadcast assignment information includes at least one of a burst size field indicating a size of the MAC control message, a resource index field indicating an allocation location and an allocation size of the resource region, a long TTI indicator field indicating a number of subframes spanned by the resource region, and a transmission format field indicating whether a time domain is being repeated.

19. The base station of claim 16, wherein
the masking prefix is set to 0b0, and
wherein the type indicator is set to 0b010 and the masking code corresponds to a decimal value of 4094, or
wherein the type indicator is set to 0b001 and the masking code corresponds to a decimal value of 4095.

20. The base station of claim 16, wherein the MAC control message is an AAI-MTE-IND message or an AAI-MGMC message.

* * * * *